(12) United States Patent
Harris et al.

(10) Patent No.: US 6,496,780 B1
(45) Date of Patent: Dec. 17, 2002

(54) SYSTEMS AND METHODS FOR CONVEYING WEATHER REPORTS

(75) Inventors: Ronald Alan Harris, Nashua, NH (US); Clifford Edward Medling, Jr., Nashua, NH (US); Peter Douglas Cote, Norwood, MA (US)

(73) Assignee: WSI Corporation, Billerica, MA (US)

( * ) Notice: Subject to any disclaimer, the term of this patent is extended or adjusted under 35 U.S.C. 154(b) by 45 days.

(21) Appl. No.: 09/659,911

(22) Filed: Sep. 12, 2000

(51) Int. Cl.⁷ .............................................. G06F 169/00
(52) U.S. Cl. ............................................. 702/3; 702/5
(58) Field of Search ........................ 702/3, 4; 706/930, 706/931; 342/26, 640

(56) References Cited

U.S. PATENT DOCUMENTS

| | | | | |
|---|---|---|---|---|
| 5,379,215 A | * | 1/1995 | Kruhoeffer et al. | 702/3 |
| 5,583,972 A | * | 12/1996 | Miller | 324/640 |
| 5,654,886 A | * | 8/1997 | Zereski et al. | 702/3 |
| 5,751,289 A | * | 5/1998 | Myers | 345/419 |
| 5,848,378 A | * | 12/1998 | Shelton et al. | 702/3 |
| 5,999,882 A | * | 12/1999 | Simpson et al. | 702/3 |
| 6,125,328 A | * | 9/2000 | Baron et al. | 702/3 |
| 6,163,756 A | * | 12/2000 | Baron et al. | 702/3 |
| 6,188,960 B1 | * | 2/2001 | Baron et al. | 702/3 |

OTHER PUBLICATIONS

Dec. 7, 2000 Screen Prints from www.scapeware3d.com, 5 pages.
Dec. 7, 2000 Screen Print from www.realpittsburgh.com/partners/wpxi/cameras/towercam.html, 1 page.

* cited by examiner

Primary Examiner—Donald E. McElheny, Jr.
(74) Attorney, Agent, or Firm—David J. Powsner; Nutter McClennen & Fish LLP

(57) ABSTRACT

A system for conveying a weather report includes a television transmitter, cable head-end or other broadcast device and a television receiver or other display device. A sequence of images broadcast by the transmitter and displayed by the receiver depict sun, sky, clouds, rain and other weather conditions superimposed on a landmark associated with a city, county or region which the report covers. To provide a temporal perspective of the report, a clock face, time line and/or rising/setting sun are superimposed on each of the images, indicating the hours at which the depicted weather conditions are forecasted to occur.

60 Claims, 9 Drawing Sheets

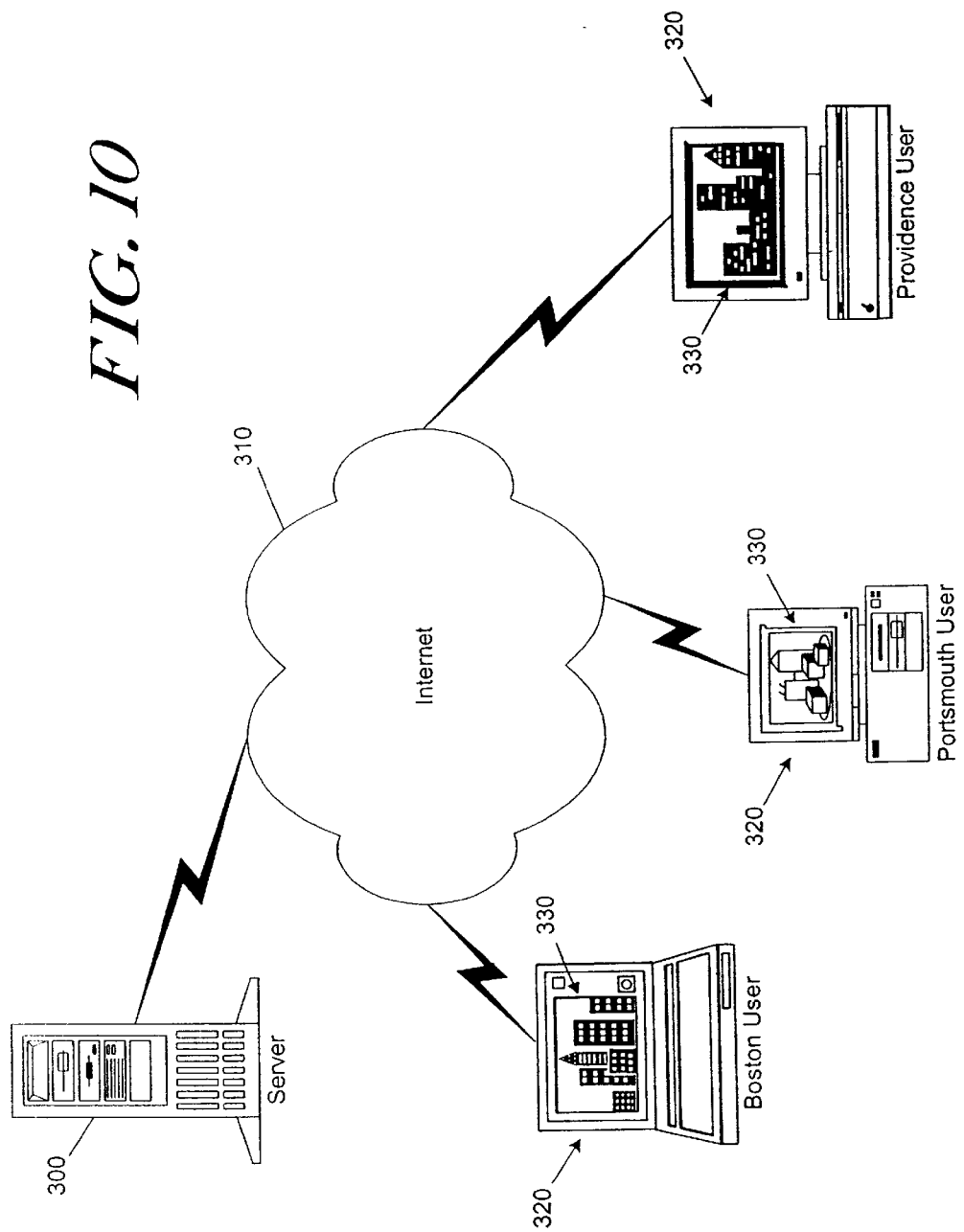

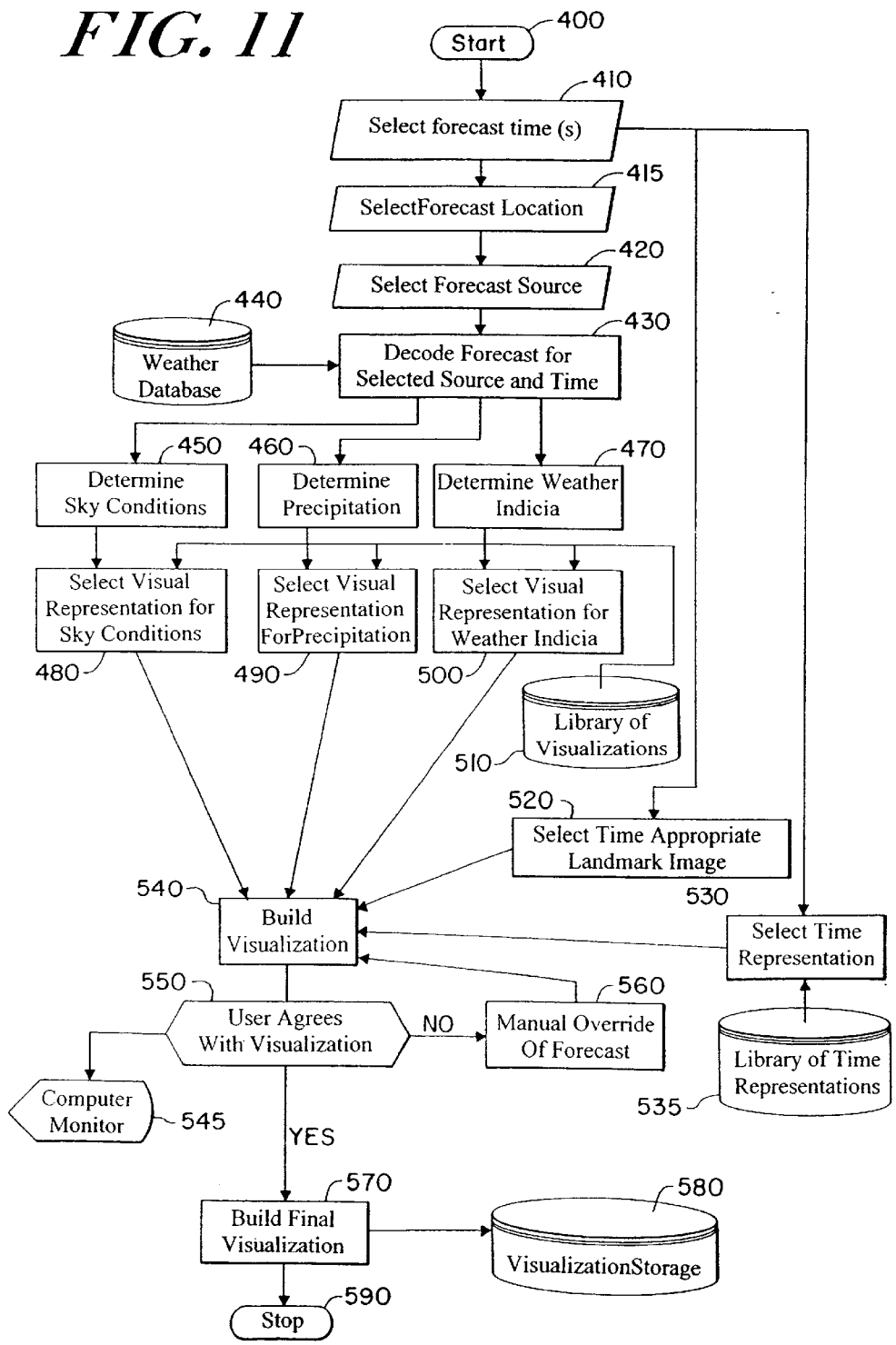

Cloud Type Table

| Cloud Cover | Cloud Cover (Index) | Cloud Ceiling (ft) | Ceiling (index) | 6Hr T-storm Prob. |
|---|---|---|---|---|
| CL | 1 | >12000 | 1-7 | |
| SC | 4 | 500-900 | <=3 | |
| SC | 4 | 1000-3000ft | 4 | |
| SC | 4 | 3100-6500 | 5 | |
| SC | 4 | 3100-6500 | 5 | >=30 |
| SC | 4 | 6600-12000 | >6 | |
| BK | 6 | <=3000 | <=4 | |
| BK | 6 | 3100-6500 | 5 | |
| BK | 6 | 6600-12000 | 6 | |
| BK | 6 | 3100-6500 | 5 | >=30 |
| BK | 6 | >12000 | 7 | |
| OV | 8 | <=900 | <=3 | |
| OV | 8 | <=12000 | 1-6 | >=30 |
| OV | 8 | 1000-3000 | 4 | |
| OV | 8 | 3100-6500 | 5 | |
| OV | 8 | 6600-12000 | >6 | |

*FIG. 12*

| Cloud Ref # | Cloud Movie |
|---|---|
| 1 | No clouds |
| 2 | SC_Low Clouds/Fog |
| 3 | SC_Low Cumulus |
| 4 | SC_Cumulus |
| 5 | SC_Towering_Cumulus |
| 6 | SC_Altocumulus |
| 7 | BK_Low_Stratus |
| 8 | BK_Strato_Cumulus |
| 9 | BK_Altocumulus |
| 10 | BK_Cumulonimbus |
| 11 | BK_Cirrostratus |
| 12 | OV_Low Clouds/Fog |
| 13 | OV_Cumulonimbus |
| 14 | OV_Stratus |
| 15 | OV_Stratocumulus |
| 16 | OV_Altostratus |

*FIG. 13*

Precip Type Table

| PTYPE | 6hr qpf (in.) | QPF (index) | 6Hr POPs | Wind Speed (mph) | Temp (F) |
|---|---|---|---|---|---|
| R\|\|S\|\|Z | 0 | 0 | | | |
| R | .01-.09 | 1 | >50 | | |
| R | .01-.24 | <=2 | >10 && <=30 | | |
| R | .01-.24 | <=2 | >30 | | |
| R | .25-.49 | 3 | >0 | | |
| R | .5-.99 | 4 | >30 | | |
| R | >1 | 5 | >30 | >20 | |
| S | .01-.24 | <=2 | <=30 | | |
| S | .01-.24 | <=2 | >30 | | |
| S | .25-.49 | 3 | >0 | | |
| S | .50+ | >=4 | >30 | | |
| S | >1 | 5 | >30 | >20 | |
| S | .24-.49 | 3 | >30 | | >34 |
| Z | .25-.49 | 3 | >30 | | >32 |
| Z | | | | | <32 |

*FIG. 14A*

| Precip Ref # | Precip Movie |
|---|---|
| 0 | Clear |
| 1 | Drizzle |
| 2 | Rain Showers |
| 3 | Light Rain |
| 4 | Moderate Rain |
| 5 | Heavy Rain |
| 6 | Rain/Wind |
| 7 | Snow Showers |
| 8 | Light Snow |
| 9 | Moderate Snow |
| 10 | Heavy Snow |
| 11 | Snow/Wind |
| 12 | Rain&Snow |
| 13 | Sleet |
| 14 | Freezing Rain |

*FIG. 14B*

Visibility Table

| Vis (mi) | Vis Index | Showfx Transparency |
|---|---|---|
| <0.5 | 1 | .10 |
| 1/2-7/8 | 2 | .25 |
| 1-2 3/4 | 3 | .50 |
| 3-5 | 4 | .75 |
| >5 | 5 | 1.0 |

*FIG. 15*

FOUS14 Indices

| Cloud Index | | Ceiling Index | | Vis Index | | 6hr QPF Index | | Precip Type Obstruct Vis | |
|---|---|---|---|---|---|---|---|---|---|
| CLOUDS (CLDS) | CLOUDS (Index) | Height (ft) | Height Index | Vis (mi) | Vis Index | QPF (in) | QPF Index | Precip/Index | Obstruct Vis/Index |
| CL | 1 | <200 | 1 | <0.5 | 1 | .01-.09 | 1 | Liquid – R | Haze – H |
| SC | 4 | 200-400 | 2 | 1/2-7/8 | 2 | .10-.24 | 2 | Freezing – Z | Fog – F |
| BK | 6 | 500-900 | 3 | 1-2 3/4 | 3 | .25-.49 | 3 | Snow – S | None – N |
| OV | 8 | 1000-3000 | 4 | 3-5 | 4 | .50-.99 | 4 | | |
| | | 3100-6500 | 5 | >5 | 5 | >1.0 | 5 | | |
| | | 6600-12000 | 6 | | | | | | |
| | | >12000 | 7 | | | | | | |

SYSTEMS AND METHODS FOR CONVEYING WEATHER REPORTS

BACKGROUND OF THE INVENTION

The invention pertains to weather reports and, particularly, to improved systems and methods for conveying them.

Weather reports are an integral part of modern life. People rely on them in deciding how to dress, recreate, travel, and conduct other daily activities. Among the many complaints about weather reports is that they are too easily forgotten. This is true of radio weather reports and, to a lesser extent, newspaper reports because they are too textual and largely devoid of graphics. Television weather reports often rely too heavily on complex graphics, even to the point of being dominated by them. This also makes for a forgettable experience.

Accordingly, an object of this invention is to provide improved methods and systems for conveying weather forecasts. A more particular object is to provide such methods and systems as convey forecasts that are easily remembered.

Another object of the invention is to provide such methods and systems as convey forecasts that are readily understood by the viewing audience.

A further object of the invention is to provide such methods and systems as can be utilized over or in connection with television, the Internet and other electronic media.

SUMMARY OF THE INVENTION

The foregoing objects are among those attained by the invention, which provides novel systems and methods for conveying weather reports.

According to one aspect, the invention provides a system for conveying a weather report that includes a television transmitter, cable head-end or other broadcast device and a television receiver or other display device. A sequence of images broadcast by the transmitter and displayed by the receiver depict sun, sky, clouds, rain and other weather conditions superimposed on a landmark associated with a city, county or region which the report covers.

By way of example, the transmitter can broadcast, and the receiver can display, a sequence of images depicting the weather for Boston over a twelve-hour period. The sequence shows sun and clouds superimposed on an image of Fenway Park, Boston's professional baseball stadium. The images are constructed or captured from photographs (or are otherwise photo-realistic) and are presented from a viewing perspective similar to that which viewers themselves might experience or recall. In essence, they lend familiarity to an event, i.e., the weather, that has yet to occur.

To provide a temporal perspective of the report, a clock face, time line and/or rising/setting sun are superimposed on each of the images, indicating the hours at which the depicted weather conditions will occur In yet another aspect of the invention, a system as described above depicts forecasted weather conditions by superimposing on the aforementioned sequences temperature, atmospheric or other weather readings and/or icons of weather instruments such as thermometers or barometers.

In other aspects, the invention provides methods for conveying weather reports in accord with the operation of the system described above.

In still other aspects, the invention provides a weather reporting system as described above that operates in a computer or network environment. Such a system includes a web server, electronic mail server, electronic bulletin board, or other digital data processing device that transmits or maintains for downloading weather images of the type described above (or data for constructing such images) for display on a user's computer. Such a system, according to related aspects of the invention, permits personalization or customization of the reports, for example, by display of user-selected landmarks or scenery.

These and other aspects of the invention are evident in the drawings and in the description that follows.

BRIEF DESCRIPTION OF THE DRAWINGS

The invention will be more fully understood from the following detailed description taken in conjunction with the accompanying drawings, in which:

FIG. 10 depicts a system according to the invention for conveying a weather forecast via the Internet;

FIG. 11 depicts a flowchart of operation of a preferred embodiment of the invention; and FIGS. 12–16 depict tables used in a preferred embodiment of the invention.

DETAILED DESCRIPTION OF THE ILLUSTRATED EMBODIMENT

Figure 1:
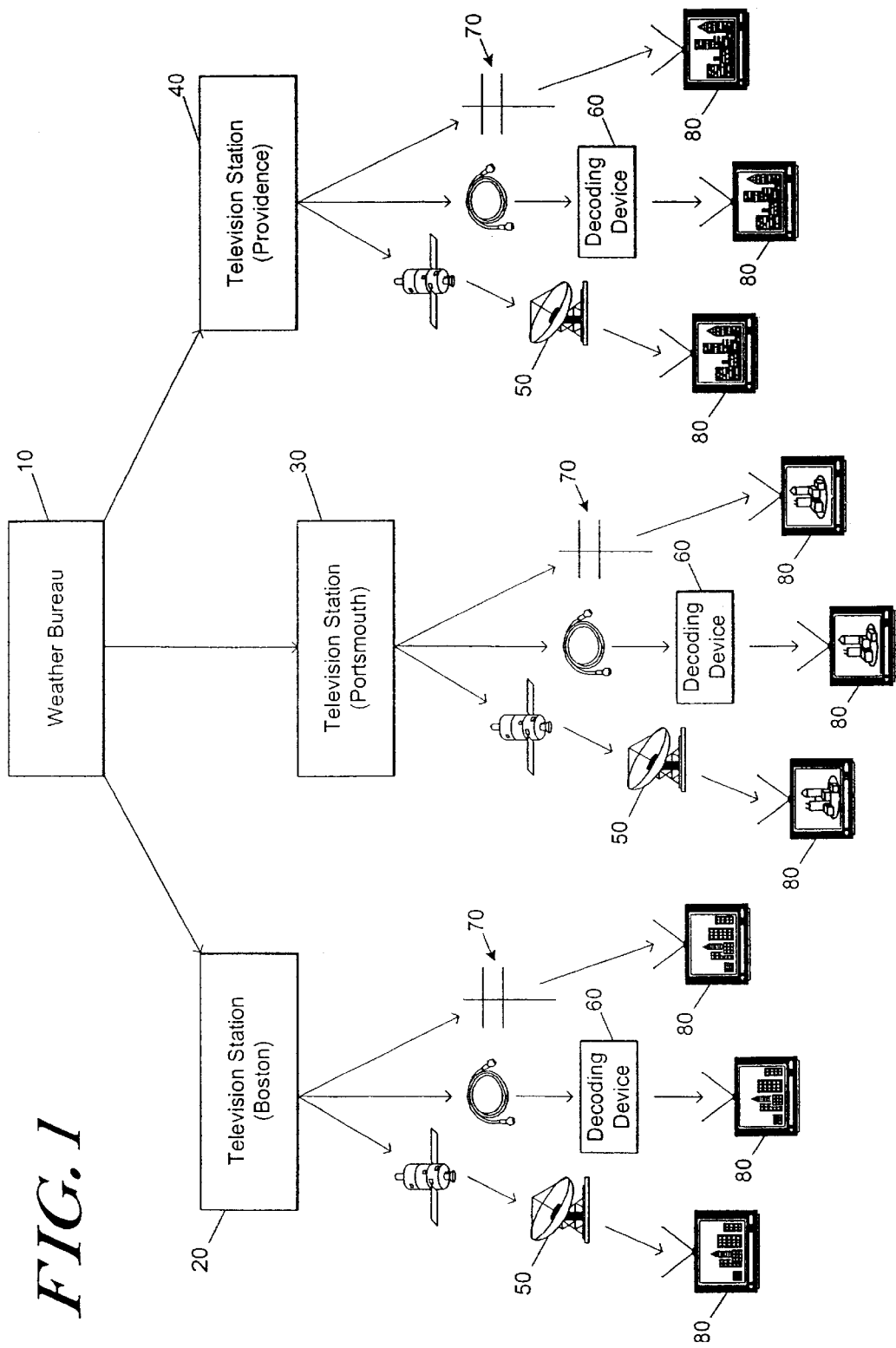
FIG. 1 illustrates a system according to the invention for conveying a weather forecast via broadcast media.
Figure 2:
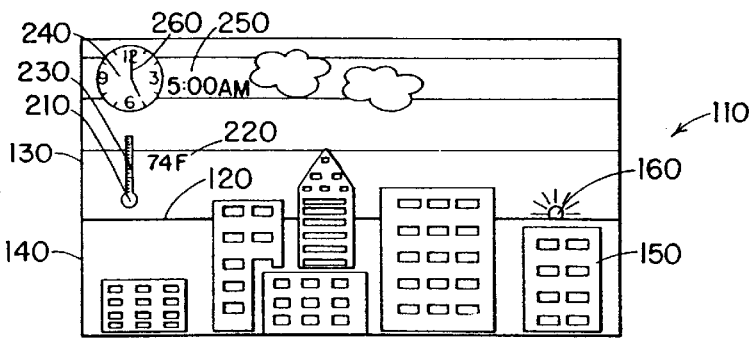
FIGS. 2–9 depict a sequence of weather forecast images of the type displayed by a system according to the invention.
Figure 3:
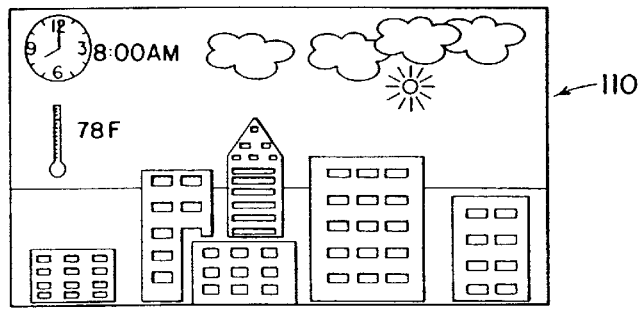
Figure 4:
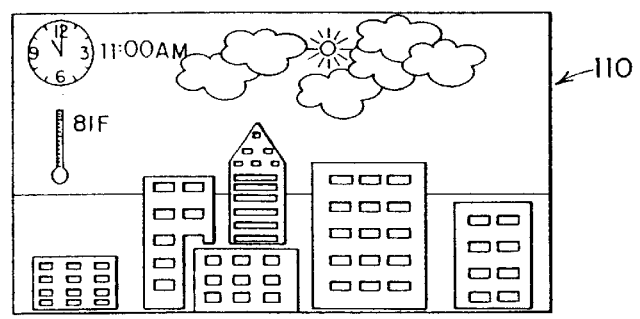

FIG. 1 illustrates a system according to the invention for conveying weather forecasts via television broadcasts. Illustrated weather service bureau 10 supplies weather forecast data to television stations 20, 30, 40, e.g., in New England. The stations 20, 30, 40, in turn, present weather reports based on the forecast data, and transmit the reports via a television tower (or other broadcast device) to viewers, e.g., via a satellite dish 50, a cable television decoding device 60, or a television reception antenna 70, for viewing on television sets 80 or other display devices.

In the illustrated embodiment of FIG. 1, the television stations 20, 30, 40 are in different geographic regions, e.g., Boston, Portsmouth, and Providence. The weather reports are tailored for those regions accordingly. Specifically, forecasted weather conditions for the respective regions are superimposed on and/or juxtaposed against a landmark associated with the region. This is depicted in the drawing by televisions 80 within each region displaying a salient landmark for that region.

The term "region," as used herein, encompasses a geographic area of any size and/or population. Exemplary "regions" include, but are not limited to, cities, towns, and states. The term "landmark," as used herein, can refer to any natural or man-made structure(s) or condition(s). Exemplary landmarks include, but are not limited to, skylines, water views, nature views, landscapes, sports venues, tourist attractions, and airports. Thus, exemplary landmarks for the region of New York City could include Yankee Stadium, the Statue of Liberty, John F. Kennedy International airport, and a skyline that depicts the Empire State Building. Preferably, a landmark will be readily recognized by viewers and associated with the region it represents. To increase such an association, the appearance of the landmark may vary, e.g., to more accurately reflect the current season.

FIGS. 2–9 illustrate a weather report as broadcast to, and displayed on, the television screen 110 of a viewer in one of the regions depicted in FIG. 1. Each of FIGS. 2–9 depicts a respective time segment or "snippet" of the report, and indicates the associated time (e.g., via a clock face). In a preferred embodiment, the segments are shown in continuous two- or three-dimensional animation —though, they can also be presented as static images which the user can progress through via a television "remote," or other input device.

The weather report image displayed on a viewer's screen 110 is divided, via a horizon line 120, into a skyline portion 130 and a land or water portion 140. A landmark 150 is superimposed on one or both of these, as are one or more weather indicia (e.g., clouds) and time indicia (e.g., clock face). This concurrent display of these indicia and the landmark 150 provide an impressionistic or otherwise memorable weather forecast for a viewer.

Specific weather forecast information is conveyed by the presence, position, and interrelationship of recognizable weather indicia, and, optionally, indicia of weather measurement instruments (e.g., thermometers), in the segments displayed on the viewer's screen 110. During the weather report, the segments also continually depict, or otherwise indicate, the specific time to which the respective forecast segment pertains.

Figure 8:
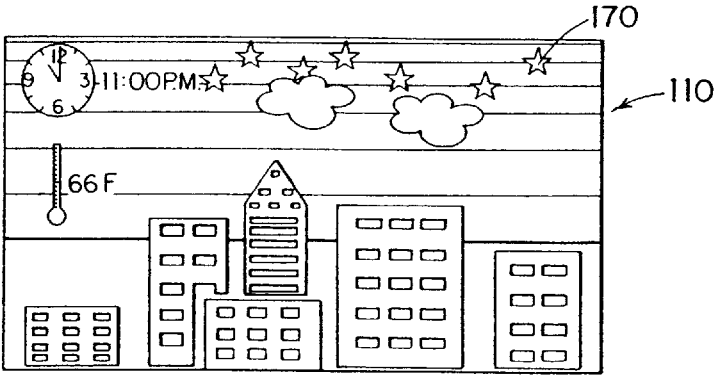
Figure 9:
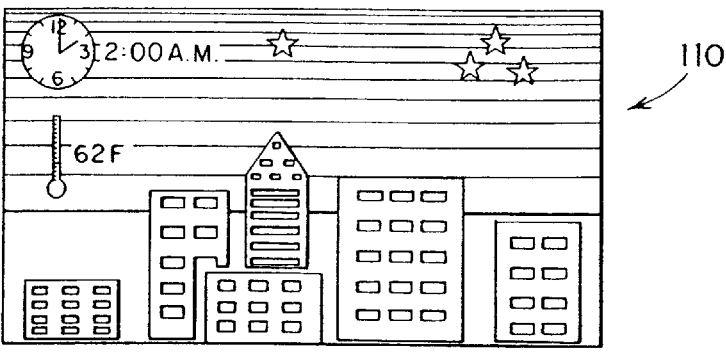

For example, the presence (or lack thereof) and position of the sun 160 throughout the sequence of images conveys both weather information and time. Thus, in FIGS. 2–4, 6 and 7, the presence of sun 160 indicates that it is daytime and that the sky is at least partially clear, while the absence of the sun from FIGS. 5, 8 and 9, coupled with the darker shade of the sky region 130, indicates cloudy skies and/or nighttime. An indication of the latter may be further underscored by the presence of stars 170 as shown in FIGS. 8 and 9 as well as the presence and/or position of the moon (not shown).

In addition to, or in lieu of, the sun 160, the weather report may also depict one or more clouds 180 to further convey weather forecast information. The number and type (e.g., cumulus and/or stratus) of clouds 180 and their movement on the screen during the report reflect the likelihood of rain. For example, if the number of clouds increases as the weather report progresses (see FIGS. 2–4), rain is likely impending, while if the number of clouds decreases or remains constant (see FIG. 6–9), impending rain is unlikely.

Figure 5:
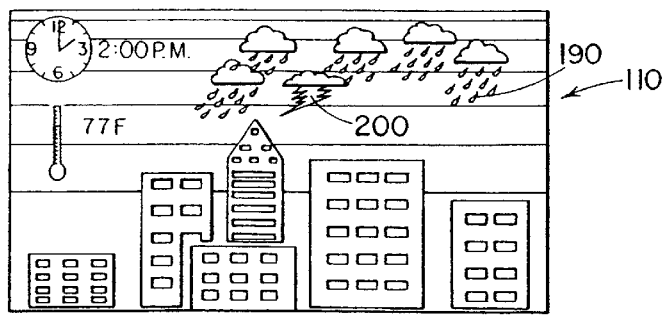
Figure 6:
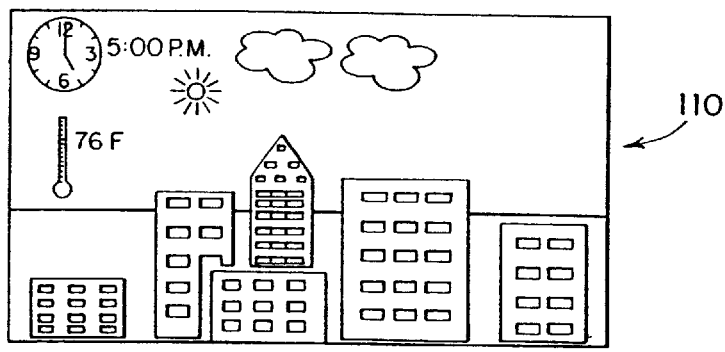
Figure 7:
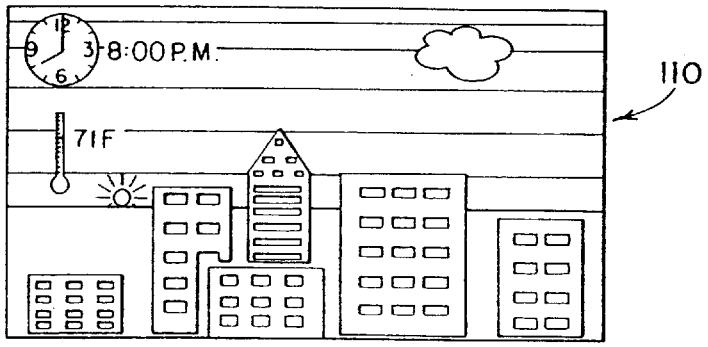

Forecasted rain and/or other weather phenomena including, but not limited to, snow, hail, haze, fog, tornados or hurricanes, may also be shown via imagery on a viewer's screen 110. As illustrated in FIG. 5, rain is indicated by raindrops 190 and, if forecasted, accompanying lightening 200. The intensity of the rain is depicted by the size and or number of raindrops 190. Accompanying high winds, may also be depicted, e.g., via a waving flag and/or movement trails behind clouds. Moreover, recent rain may be depicted, e.g., via puddles and/or a rainbow, as may be recent snowfall, e.g., via snow accumulation.

During depiction of the weather report, associated sounds may accompany the weather imagery. By way of non-limiting example, claps of thunder may follow flashes of lightening, and sounds of rain drops impacting the landmark may accompany rainfall. Also, the sounds of birds chirping may accompany sunny weather, while the sound of blowing wind may accompany snow.

In addition to weather imagery, indicia and sounds, the screen 110 may display weather measurements and/or the instruments associated with, or used to obtain, them. For example, in FIGS. 2–9, the screen includes a thermometer 210 and an accompanying temperature readout 220.

While the position of thermometer 210 and readout 220 generally remain constant throughout the weather report, their temperature readings are adjusted to reflect temperature changes, if any, forecasted to occur in the region. Specifically, the thermometer 210 includes a bar 230, e.g., mercury level, that moves up or downward to reflect temperature changes, preferably while the numeric temperature readout 220 is likewise adjusted. One skilled in the art will appreciate that although the temperature 220 is displayed in degrees Fahrenheit, it may instead, or additionally, be displayed in degrees Celsius and/or otherwise.

Also, although not shown, it is further understood that the screen may display other weather measurements and/or the instruments associated with, or used to obtain, them. For example, the screen 110 could depict an anemometer and/or an accompanying wind velocity readout, as well as a barometer and/or an accompanying barometric pressure readout. Other weather measurements that may be displayed in a similar vein include, but are not limited to, relative humidity, heat index, and wind chill.

As described above, the time of day to which each segment of the forecast pertains may be discernable from indicia such as the sun, stars sky shading, and shadows (e.g., as the sun or moon moves past the landmark). In the illustrated embodiment, the time is also indicated by a clock 240 (or sundial), time line (not shown), a numerical time readout 250 or other time indicator.

Those of ordinary skill in the art will appreciate that the segments depicted in FIG. 2–9 can be generated in the conventional manner using graphic tools known in the art. Thus, for example, an image, e.g., photograph, of the landmark 150 can be digitized for display with each of the segments. Images of the time and weather indicia depicted in the drawings can be artificially generated and/or reproduced from stock images and superimposed on and/or juxtaposed against the landmark. The position of these indicia with respect to the landmark 150 is adjusted, as necessary, from segment to segment as is known in the art to represent changing weather conditions for the region associated with the landmark.

In a preferred embodiment, the segments are photo-realistic renderings or simulated photo-realistic images, e.g., created manually or captured from pictures or moving pictures. The segments also depict the underlying images, e.g., landmark 150, from a viewing perspective similar to that which viewers themselves might experience or recall.

Moreover, although not shown, one of ordinary skill in the art will appreciate that the teachings herein can be applied to disseminate weather reports via media, e.g., electronic or otherwise, other than television. Non-limiting examples include prerecorded magnetic media, electronic mail and the Internet. Further, the weather reports may be displayed on or via alternate display devices, e.g., a computer screen or monitor, a portable viewing device, and a movie screen, and/or may be printed or otherwise reproduced on a printer or other visual presentation medium, each as is generally known in the art without undue experimentation and without departing from the scope of the invention.

With respect to electronic implementation of the teachings herein, FIG. 10 depicts a server 300, e.g., a web server, electronic mail server, electronic bulletin board or other network device, that can transmit images or segments (or data representative thereof) of the type depicted in FIGS. 2–9 and discussed above to a client device 320 (e.g., a computer, cell phone, pager, or any other suitable communication device) coupled thereto over the Internet 310, or over another network or communication medium. The client device 320, in turn, can display these images or segments, e.g., on a monitor or screen 330, to convey a weather forecast to a viewer as discussed above.

In the illustrated embodiment of FIG. 10, the clients 320 are computers in different geographic regions, e.g., Boston, Portsmouth, and Providence. Weather reports, as discussed above and depicted in FIGS. 2–9, are tailored for those regions accordingly. Specifically, forecasted weather conditions for the respective regions are superimposed on and/or juxtaposed against a landmark associated with the region. This is depicted in the drawing by the computers 320 within these regions displaying a salient landmark for that region on their screens or monitors 330.

Moreover, in the embodiment of FIG. 10, the computer 320 can access a viewer selected, customized image of a landmark for display in connection with the weather forecast. This foregoes the need for the server 300 to generate and transmit via the Internet 310 a landmark image in connection with the weather forecast, permits a viewer's personalization of forecast information, and provides an even more impressionistic and memorable weather forecast for the viewer. Exemplary customized images include, but are not limited to, personalized or generic images of, or from within, a house or car.

A further understanding of the embodiments discussed above may be attained by FIG. 11, which is a flow-chart showing a preferred practice of the invention, as described in the text that follows.

In block 400 the process is started.

In block 410, the user selects the time in the future for which they wish to create a visualization.

In block 415, the user selects a specific point location for which a forecast visualization is to be generated. For the invention, this location would be a memorable and distinct place that is familiar to the viewers of the final output visualization.

In block 420, the user selects the data source for use in generating the forecast visualization. This could be a NWS point forecast, computer forecast model or forecast data provided by a commercial forecast service for the selected location.

In block 430, data of the selected type, forecast time and geographic location is extracted from a weather database (block 440) and is decoded using logic specific to the data type selected.

In blocks 450 and 460, the expected sky condition, precipitation, and weather indicia are determined using the decoded data from block 430. These parameters are determined using logic as specified in table A.

In block 470, the desired weather indicia are extracted from the decoded data in block 430.

In block 480, 490, 500, a specific visualization from a library of visualizations (block 510) is selected to represent the forecast data determined in blocks 450, 460, and 470. These visualizations could include photographs, video, photo-realistic rendering/animations, iconic or textual representations of the forecast data.

In block 520, an appropriate landmark image is selected based on the user specified geographic location (block 415) and the selected forecast time (block 410).

In block 530, the user selected a specific time representation the invention then recalls the selected representation from a library of time representations (block 535), and modifies said graphical representation to appropriately reflect the specified time (block 410).

In block 540, the visualization is created using the representations selected in blocks 480, 490, 500, 520 and 530. This visualization can be accomplished using well known 2D and 3D computer graphics, rendering and compositing techniques. It is recommended that this visualization is accomplished using the commercially available Showfx product from Weather Services International. The resultant visualization is presented to the user for approval via a computer monitor (block 545).

In block 550, the visualization produced in block 540 is reviewed by the user, allowing them to verify the look and accuracy of the forecast visualization with respect to their knowledge and experience. If the user does not agree with the visualization, then in block 560, the user modifies the parameters of the visualization to agree with the desired forecast representation. The invention provides the user with a simplified interface for implementing these modifications unencumbered by the complexity of the underlying rendering application. When the user has selected these modifications, control is passed back to block 540, which recreates a visualization using these modifications for approval, or additional modifications in block 550.

Once the user has approved the visualization, the visualization is rendered into an output format consistent with the desired usage and stored to a physical device such as a computer disk drive or video still store (block 580).

The process is then terminated in block 590.

One skilled in the art will appreciate further features and advantages of the invention based on the above-described embodiments. Accordingly, the invention is not to be limited by what has been particularly shown and described, except as indicated by the appended claims.

What is claimed is:

1. A system for reporting a weather forecast, comprising:
    a display device that displays an image depicting a landmark and that concurrently displays a sequence of plural weather images depicting weather conditions at a geographic region associated with the landmark,
    wherein each of the plural weather images
        (i) depicts a respective weather condition for the region at a respective selected time, and
        (ii) indicates that respective selected time,
    such that the concurrent display of the image depicting the landmark and the sequence of plural weather images conveys a weather forecast for the region.

2. The system of claim 1, wherein the display device displays the sequence of plural weather images superimposed on the image that depicts the landmark.

3. The system of claim 1, wherein the display device displays the sequence of plural weather images so as to depict the weather conditions in animation.

4. The system of claim 1, wherein the sequence of plural weather images depicts the weather conditions and the landmark in three dimensions.

5. The system of claim 1, wherein the display device displays, concurrently with the image depicting the landmark and with at least one image in the sequence of plural weather images, at least one weather indicia selected from the group consisting of sun, clouds, rain, snow, hail, lightening, fog, haze, wind, and rainbows.

6. The system of claim 5, wherein the display device further displays, concurrently with the image depicting the landmark and with at least one image in the sequence of plural weather images, a weather measurement selected from the group consisting of temperature, barometric pressure, relative humidity, wind velocity, wind chill, and heat index.

7. The system of claim 6, wherein the display device further displays, concurrently with the image depicting the landmark and with at least one image in the sequence of plural weather images, an icon depicting an instrument with which the weather measurement is associated.

8. The system of claim 1, wherein each of the plural weather images indicates the respective selective time via the depiction of at least one time indicia.

9. The system of claim 8, wherein each of the at least one time indicia is selected from the group consisting of a clock face, a time line, a numeric time display, sun presence, sun position, moon presence, and moon position.

10. The system of claim 1, wherein the landmark is selected from the group consisting of a sports venue, a tourist attraction, an airport, a skyline, a water view, a nature view, and a landscape.

11. A system for reporting a weather forecast, comprising:
a broadcast device that broadcasts
    (i) an image depicting a landmark associated with a geographic region, where the image depicting the landmark can be photorealistic, and
    (ii) a sequence of plural weather images depicting weather conditions at a geographic region associated with the landmark,
    wherein each of the plural weather images depicts a respective weather condition for the region at a respective selected time, and indicates that respective selected time,
    such that the concurrent display of the image depicting the landmark and the sequence of plural weather images conveys a weather forecast for the region; and
a display device in electromagnetic communication with the broadcast device that receives the broadcast images and that concurrently displays the the image depicting the landmark and the sequence of plural weather images to convey a weather forecast for the region.

12. The system of claim 11, wherein the broadcast device broadcasts and the display device displays the sequence of plural weather images superimposed on the image that depicts the landmark.

13. The system of claim 11, wherein the broadcast device broadcasts and the display device displays the sequence of plural weather images so as to depict the weather conditions in animation.

14. The system of claim 11, wherein the sequence of plural weather images depicts the weather conditions and the landmark in three dimensions.

15. The system of claim 11, wherein the broadcast device broadcasts and the display device displays, concurrently with the image depicting the landmark and with at least one image in the sequence of plural weather images, at least one weather indicia selected from the group consisting of sun, clouds, rain, snow, hail, lightening, fog, haze, wind, and rainbows.

16. The system of claim 15, wherein the broadcast device further broadcasts and the display device further displays, concurrently with the image depicting the landmark and with at least one image in the sequence of plural weather images, a weather measurement selected from the group consisting of temperature, barometric pressure, relative humidity, wind velocity, wind chill, and heat index.

17. The system of claim 16, wherein the broadcast device further broadcasts and the display device further displays, concurrently with the image depicting the landmark and with at least one image in the sequence of plural weather images, an icon depicting an instrument with which the weather measurement is associated.

18. The system of claim 11, wherein each of the plural weather images indicates the respective selective time via the depiction of at least one time indicia.

19. The system of claim 18, wherein each of the at least one time indicia is selected from the group consisting of a clock face, a time line, a numeric time display, sun presence, sun position, moon presence, and moon position.

20. The system of claim 11, wherein the landmark is selected from the group consisting of a sports venue, a tourist attraction, an airport, a skyline, a water view, a nature view and a landscape.

21. A method for reporting a weather forecast, comprising the steps of:
displaying an image depicting a landmark and that concurrently displays a sequence of weather images depicting weather conditions at a geographic region associated with the landmark,
wherein each of the plural weather images
    (i) depicts a respective weather condition for the region at a respective selected time, and
    (ii) indicates that respective selected time,
such that the concurrent display of the image depicting the landmark and the sequence of plural weather images conveys a weather forecast for the region.

22. The method of claim 21, comprising the step of displaying the sequence of plural weather images superimposed on the image that depicts the landmark.

23. The method of claim 21, comprising the step of displaying the sequence of plural weather images so as to depict the weather conditions in animation.

24. The method of claim 21, wherein the sequence of plural weather images depicts the weather conditions and the landmark in three dimensions.

25. The method of claim 21, comprising the step of displaying, concurrently with the image depicting the landmark and with at least one image in the sequence of plural weather images, at least one weather indicia selected from the group consisting of sun, clouds, rain, snow, hail, lightening, fog, haze, wind, and rainbows.

26. The method of claim 25, comprising displaying, concurrently with the image depicting the landmark and with at least one image in the sequence of plural weather images, a weather measurement selected from the group consisting of temperature, barometric pressure, relative humidity, wind velocity, wind chill, and heat index.

27. The method of claim 26, comprising displaying, concurrently with the image depicting the landmark and with at least one image in the sequence of plural weather images, an icon depicting an instrument with which the weather measurement is associated.

28. The method of claim 21, wherein each of the plural weather images indicates the respective selective time via the depiction of at least one time indicia.

29. The method of claim 28, wherein each of the at least one time indicia is selected from the group consisting of a clock face, a time line, a numeric time display, sun presence, sun position, moon presence, and moon position.

30. The method of claim 21, wherein the landmark is selected from the group consisting of a sports venue, a tourist attraction, an airport, a skyline, a water view, a nature view and a landscape.

31. A method for reporting a weather forecast, comprising the steps of:
broadcasting (i) an image depicting a landmark associated with a geographic region, and (ii) a sequence of plural weather images depicting weather conditions at a geographic region associated with the landmark, wherein each of the plural weather images depicts a respective weather condition for the region at a respective selected time, and indicates that respective selected time, such that the concurrent display of the image depicting the landmark and the sequence of plural weather images conveys a weather forecast for the region; and concurrently displaying the the image depicting the landmark and the sequence of plural weather images to convey a weather forecast for the region.

32. The method of claim 31, comprising broadcasting and displaying the sequence of plural weather images superimposed on the image that depicts the landmark.

33. The method of claim 31, comprising broadcasting and displaying the sequence of plural weather images so as to depict the weather conditions in animation.

34. The method of claim 31, wherein the sequence of plural weather images depicts the weather conditions and the landmark in three dimensions.

35. The method of claim 31, comprising broadcasting and displaying, concurrently with the image depicting the landmark and with at least one image in the sequence of plural weather images, at least one weather indicia selected from the group consisting of sun, clouds, rain, snow, hail, lightening, fog, haze, wind, and rainbows.

36. The method of claim 35, comprising broadcasting and displaying, concurrently with the image depicting the landmark and with at least one image in the sequence of plural weather images, a weather measurement selected from the group consisting of temperature, barometric pressure, relative humidity, wind velocity, wind chill, and heat index.

37. The method of claim 36, comprising broadcasting and displaying, concurrently with the image depicting the landmark and with at least one image in the sequence of plural weather images, an icon depicting an instrument with which the weather measurement is associated.

38. The method of claim 31, wherein each of the plural weather images indicates the respective selective time via the depiction of at least one time indicia.

39. The method of claim 38, wherein each of the at least one time indicia is selected from the group consisting of a clock face, a time line, a numeric time display, sun presence, sun position, moon presence, and moon position.

40. The method of claim 31, wherein the landmark is selected from the group consisting of a sports venue, a tourist attraction, an airport, a skyline, a water view, a nature view and a landscape.

41. A system for reporting a weather forecast, comprising:

a server that generates a weather forecast information, a client device in communication with the server, the client device responding to the weather forecast information to display
(i) an image depicting a landmark associated with a geographic region, and
(ii) a sequence of plural weather images depicting weather conditions at a geographic region associated with the landmark, wherein each of the plural weather images depicts a respective weather condition for the region at a respective selected time, and indicates that respective selected time, such that the concurrent display of the image depicting the landmark and the sequence of plural weather images conveys a weather forecast for the region.

42. The system of claim 41, wherein the client device responds to the weather forecast information to display the sequence of plural weather images superimposed on the image that depicts the landmark.

43. The system of claim 41, wherein the client device responds to the weather forecast information to display the sequence of plural weather images so as to depict the weather conditions in animation.

44. The system of claim 41, wherein the sequence of plural weather images depicts the weather conditions and the landmark in three dimensions.

45. The system of claim 41, wherein the client device responds to the weather forecast information to display, concurrently with the image depicting the landmark and with at least one image in the sequence of plural weather images, at least one weather indicia selected from the group consisting of sun, clouds, rain, snow, hail, lightening, fog, haze, wind, and rainbows.

46. The system of claim 45, wherein the client device responds to the weather forecast information to display, concurrently with the image depicting the landmark and with at least one image in the sequence of plural weather images, a weather measurement selected from the group consisting of temperature, barometric pressure, relative humidity, wind velocity, wind chill, and heat index.

47. The system of claim 46, wherein the client device responds to the weather forecast information to display, concurrently with the image depicting the landmark and with at least one image in the sequence of plural weather images, an icon depicting an instrument with which the weather measurement is associated.

48. The system of claim 41, wherein each of the plural weather images indicates the respective selective time via the depiction of at least one time indicia.

49. The system of claim 48, wherein each of the at least one time indicia is selected from the group consisting of a clock face, a time line, a numeric time display, sun presence, sun position, moon presence, and moon position.

50. The system of claim 41, wherein the landmark is selected from the group consisting of a sports venue, a tourist attraction, an airport, a skyline, a water view, a nature view and a landscape.

51. A method for reporting a weather forecast, comprising:

generating weather forecast information,
responding to the weather forecast information to display
(i) an image depicting a landmark associated with a geographic region, and
(ii) a sequence of plural weather images depicting weather conditions at a geographic region associated with the landmark, wherein each of the plural weather images depicts a respective weather condition for the region at a respective selected time, and indicates that respective selected time, such that the concurrent display of the image depicting the landmark and the sequence of plural weather images conveys a weather forecast for the region.

52. The method of claim 51, wherein the responding step includes responding to the weather forecast information to display the sequence of plural weather images superimposed on the image that depicts the landmark.

53. The method of claim 51, wherein the responding step includes responding to the weather forecast information to display the sequence of plural weather images so as to depict the weather conditions in animation.

54. The method of claim 51, wherein the sequence of plural weather images depicts the weather conditions and the landmark in three dimensions.

55. The method of claim 51, wherein the responding step includes responding to the weather forecast information to display, concurrently with the image depicting the landmark and with at least one image in the sequence of plural weather images, at least one weather indicia selected from the group consisting of sun, clouds, rain, snow, hail, lightening, fog, haze, wind, and rainbows.

56. The method of claim 55, wherein the responding step includes responding to the weather forecast information to display, concurrently with the image depicting the landmark and with at least one image in the sequence of plural weather images, a weather measurement selected from the group consisting of temperature, barometric pressure, relative humidity, wind velocity, wind chill, and heat index.

57. The method of claim 56, wherein the responding step includes responding to the weather forecast information to display, concurrently with the image depicting the landmark and with at least one image in the sequence of plural weather images, an icon depicting an instrument with which the weather measurement is associated.

58. The method of claim 51, wherein each of the plural weather images indicates the respective selective time via the depiction of at least one time indicia.

59. The method of claim 58, wherein each of the at least one time indicia is selected from the group consisting of a clock face, a time line, a numeric time display, sun presence, sun position, moon presence, and moon position.

60. The method of claim 51, wherein the landmark is selected from the group consisting of a sports venue, a tourist attraction, an airport, a skyline, a water view, a nature view and a landscape.

* * * * *